(12) United States Patent
Cohen et al.

(10) Patent No.: US 10,078,699 B2
(45) Date of Patent: Sep. 18, 2018

(54) FIELD MAPPINGS FOR PROPERTIES TO FACILITATE OBJECT INHERITANCE

(71) Applicant: Facebook, Inc., Menlo Park, CA (US)

(72) Inventors: Jonah Cohen, Seattle, WA (US); Naitik Shah, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 823 days.

(21) Appl. No.: 14/144,977

(22) Filed: Dec. 31, 2013

(65) Prior Publication Data
US 2015/0186439 A1 Jul. 2, 2015

(51) Int. Cl.
*G06F 17/30* (2006.01)

(52) U.S. Cl.
CPC .............................. *G06F 17/30867* (2013.01)

(58) Field of Classification Search
None
See application file for complete search history.

(56) References Cited

U.S. PATENT DOCUMENTS

| | | | | |
|---|---|---|---|---|
| 5,708,828 A * | 1/1998 | Coleman | ........... | G06F 17/30569 707/E17.006 |
| 7,752,230 B2 * | 7/2010 | Bland | ............... | G06F 17/30563 707/709 |
| 9,450,992 B2 * | 9/2016 | Wahi | ..................... | H04L 65/403 |
| 2005/0102303 A1 * | 5/2005 | Russell | ............. | G06F 17/30292 |
| 2007/0083572 A1 * | 4/2007 | Bland | ............... | G06F 17/30563 |
| 2010/0114935 A1 * | 5/2010 | Polo-Malouvier | ..... | G06Q 10/10 707/769 |
| 2013/0238631 A1 * | 9/2013 | Carmel | ............. | G06F 17/30604 707/742 |
| 2013/0263184 A1 * | 10/2013 | Melnychenko | ...... | H04N 21/482 725/50 |
| 2014/0164512 A1 * | 6/2014 | Allen | ..................... | H04L 67/22 709/204 |
| 2014/0337358 A1 * | 11/2014 | Mitra | ................ | G06F 17/30289 707/748 |
| 2015/0113060 A1 * | 4/2015 | Wahi | ..................... | H04L 65/403 709/204 |

* cited by examiner

*Primary Examiner* — Aleksandr Kerzhner
*Assistant Examiner* — Eddy Cheung
(74) *Attorney, Agent, or Firm* — Baker Botts L.L.P.

(57) ABSTRACT

A method includes receiving a request for a property of an object, where the property has a property type and includes a property value and a property name, and the property does not conform to a property specification for the property type. The method also includes determining a field mapping for the property of the object, where the field mapping is derived from the property specification, and accessing the property of the object. The method further includes modifying the property of the object according to the field mapping. The method also includes providing as a response to the request the property of the object as modified according to the field mapping.

17 Claims, 10 Drawing Sheets

FIELD MAPPINGS FOR PROPERTIES TO FACILITATE OBJECT INHERITANCE

TECHNICAL FIELD

This disclosure generally relates to the use of field mappings for properties to facilitate object inheritance.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, an object may represent a person, place, or thing, such as for example a book, author, song, recipe, restaurant, or movie. In particular embodiments, an object may be a web page. An object may include one or more properties, where object properties can be elements, attributes, or fields that may describe an object. For example, an object may represent a place, such as for example a city, and the object's properties may include one or more of the following: geographical location; population; weather; images or a hyperlink to images of the city; and a list or array of hotels or restaurants. An object's properties can have a variety of types, such as for example Boolean, float, integer, string, or array.

In particular embodiments, a property of a first-party system can be obtained, or field-mapped, from another property or object, such as for example from a property or object of a third-party system. A property can be field-mapped from a property of a third-party system even though the two properties may have different property names, different property specifications, or may include different or incompatible data or types. A field mapping can act to convert, modify, or transform one data structure to another data structure to resolve a property name difference or a type incompatibility. In particular embodiments, a third-party object can inherit from a first-party object, and inheritance at an object level may be made possible by field mappings at a property level. Field mapping can allow the use of third-party properties and objects so that they behave just like native first-party properties and objects.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
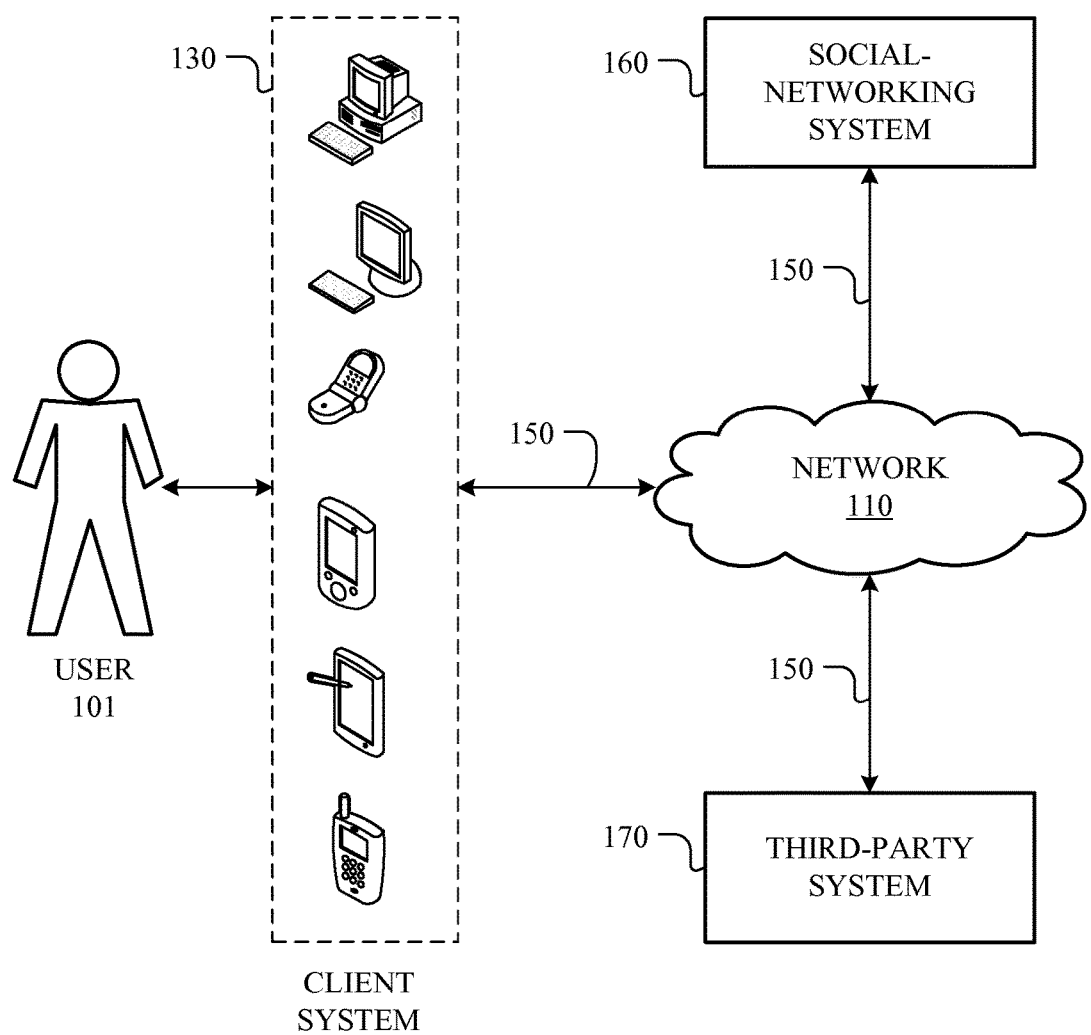
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host objects and properties of objects. Third-party system 170 may generate, store, receive, and send objects and properties, such as, for example, book objects, movie objects, restaurant objects, product objects, or any suitable objects or properties. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
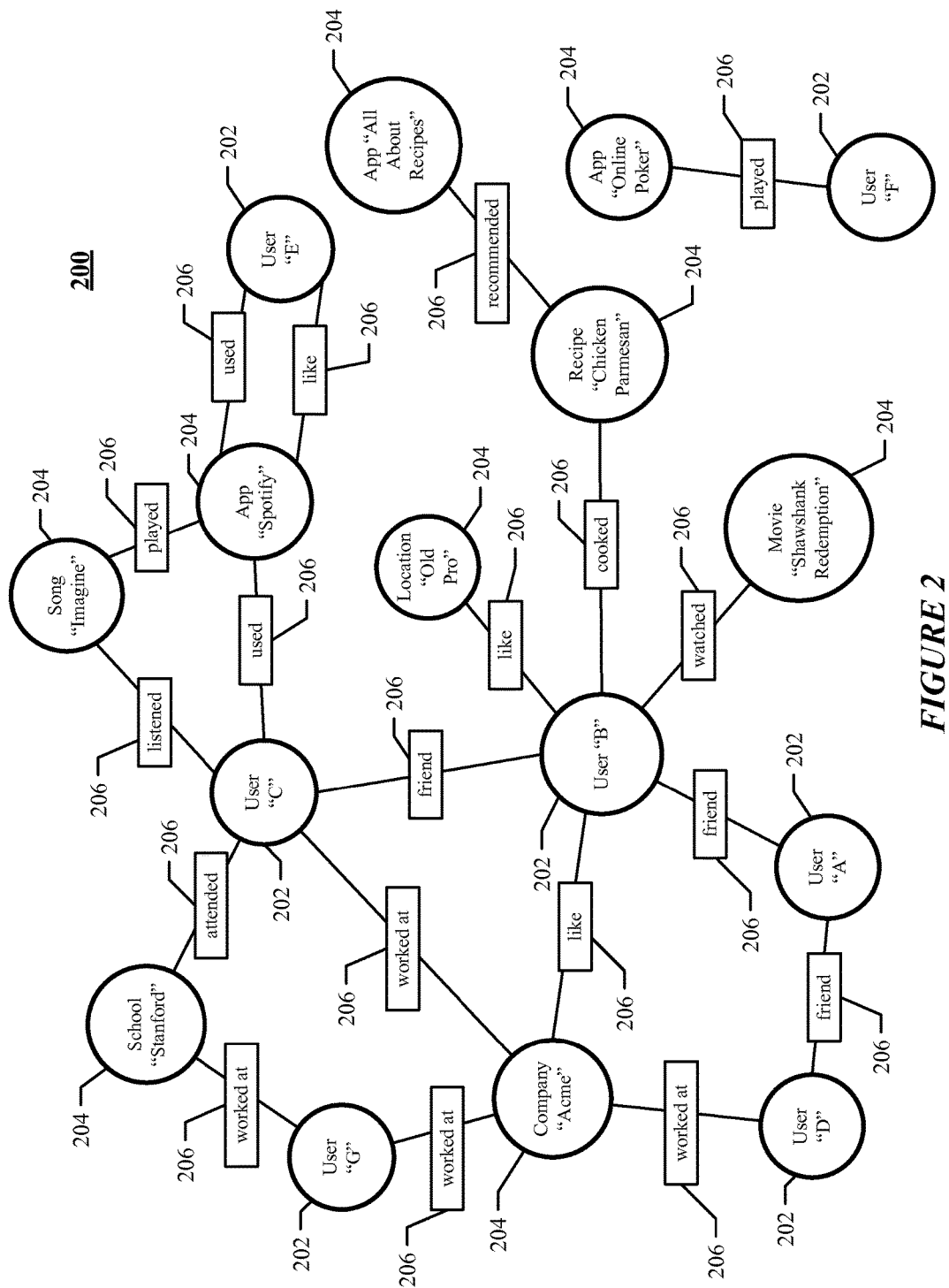
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL, or uniform resource locator); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
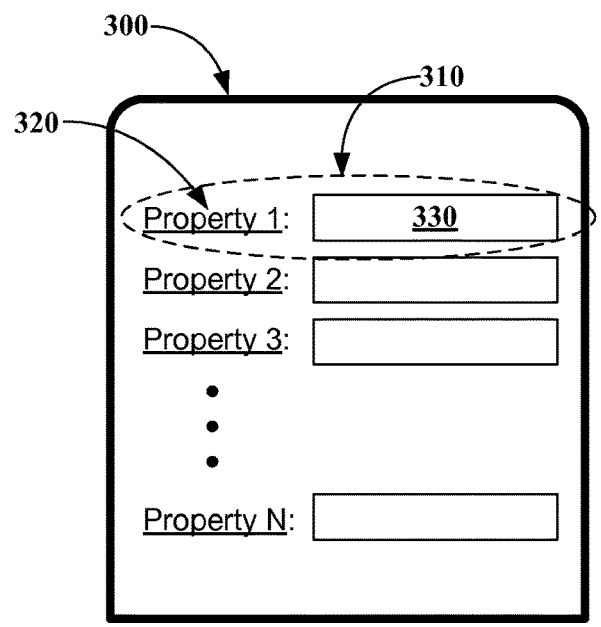
FIG. 3 illustrates an example object that includes example properties.

FIG. 3 illustrates an example object 300 that includes example properties 310. In particular embodiments, an object 300 may represent a person, place, or thing, or any suitable combination thereof. As examples and not by way of limitation, an object 300 may represent a book, author, song, recipe, image, movie, restaurant, product, actor, or city, or any suitable combination of two or more suitable objects 300. In particular embodiments, an object 300 may be part of a network 110, a social-networking system 160, or a third-party system 170. In particular embodiments, an object 300 may be a web page having a particular URL. In particular embodiments, an object 300 may be associated with a social graph 200 of a social-networking system 160. In particular embodiments an object may be a concept node 204 of a social graph 200 or may be related to a concept node 204 of a social graph 200.

In particular embodiments, an object property 310 may be associated with an object 300, and object property 310 may describe or contain information related to object 300. In particular embodiments, an object property 310 may include a reference to another object, different from the object 300 that object property 310 is part of. In particular embodiments, object properties 310 may include one or more elements that describe or are related to object 300. As illustrated in FIG. 3, an object property 310 may include a property name 320 (or, title or descriptor) and property value 330 (or, property content). In particular embodiments, an object property 310 may include property value 330, and information associated with a property name may be included in property value 330. An object property 310 may have a property name 320 that describes or corresponds to its associated property 310. Example property names 320 may include: name, title, author, company, school, description, location, address, phone, website, price, distance, quantity, menu, or image. This disclosure contemplates any suitable property names 320. In particular embodiments, property value 330 may include one or more elements, attributes, fields, data, or information that describe or are associated with property 310 or with object 300.

In particular embodiments, object properties 310 may have a variety of property types, where a property type may refer to a classification, type, or category of an object property 310. As examples and not by way of limitation, particular property types may include author properties 310, location properties 310, email properties 310, phone-number properties 310, website properties 310, image properties 310, or video properties 310. Although this disclosure describes and illustrates particular object properties 310 having particular property names 320, particular property values 330, and particular property types, this disclosure contemplates any suitable object properties 310 having any suitable property names 320, any suitable property values 330, and any suitable property types.

In particular embodiments, objects 300 may have a variety of object types, where an object type may refer to a classification, type, or category of an object 300. In particular embodiments, objects 300 of a particular object type may have similar characteristics, attributes, or properties 310. As examples and not by way of limitation, particular object types may include book objects 300, movie objects 300, restaurant objects 300, author objects 300, product objects 300, or any suitable object type. In the example of FIG. 3, object 300 may represent a book, and properties 310 of such a book object 300 may include International Standard Book Number (ISBN), title, author, image, description, number of pages, publication date, price, reviews, or rating. As another example, an object 300 may represent a singer with example properties 310 that may include one or more of the following: biographical information, list of albums, list of songs, lyrics, upcoming performance dates, reviews, images, or performance videos.

In particular embodiments, different objects 300 or object types may include one or more similar or one or more of the same properties 310, property names 320, or the same type of property value or content 330. As an example and not by way of limitation, two or more book objects 300 may have one or more similar or the same property names 320 (e.g., "ISBN"). As another example, two or more objects 300 that each represent dissimilar things (e.g., a book object and a movie object) may have one or more similar or the same property names 320 (e.g., "reviews"). In particular embodiments, different objects 300 may have one or more properties 310, property names 320, or property values 330 that are different. For example, a book object 300 and a singer object 300 may have one or more property names 320 that are different. Although this disclosure describes and illustrates particular objects 300 and particular object types having particular properties 310, this disclosure contemplates any suitable objects 300 and object types having any suitable properties 310.

In particular embodiments, property value 330 may have a variety of data types, where data type (or, type) may refer to a format or configuration of information, data, fields, or values that are included in property value 330. As an example and not by way of limitation, property value 330 data types may include any of the following or any suitable combination of two or more of the following: Boolean (e.g., a true or false value, or a 1 or 0 value); float (e.g., a floating point numeric value); integer (e.g., a signed integer numeric value); string (e.g., a series of alphanumeric characters); array (e.g., an arrangement or ordered sequence of values or information); date or time information; contact information (e.g., address, phone number, or web site); geo-point (e.g., geographic location information such as latitude, longitude, or altitude); a web address (e.g., a URL or a hyperlink); audio (e.g., music or podcast); image (e.g., a picture in Joint Photographic Experts Group, or JPEG, format); or video (e.g., a video or a hyperlink to a video). As an example and not by way of limitation, property 310 may have "Address" as a property name 320, and corresponding address property value 330 may include location information such as a street address associated with object 300. In particular embodiments, an address property value 330 may have a string data type. As another example, property 310 may have property name 320 "Images," and a corresponding image property value 330 may include pictures in JPEG format associated with object 300 or a hyperlink to such pictures.

In particular embodiments, an object property 310 may include a single element or field. In particular embodiments, an object property 310 or property value 330 may include two or more elements or fields that are all of the same type or an array with multiple elements that are all of the same type (e.g., all integers, or all strings). In particular embodiments, an object property 310 or property value 330 may include two or more elements or fields where the elements or fields are of two or more different data types. Although this disclosure describes and illustrates particular object properties 310 having particular data types of property value 330, this disclosure contemplates any suitable object property 310 having any suitable data type of property value 330.

In particular embodiments, object property 310 may be associated with a property specification, where property specification refers to a type, format, or content of an object property 310 or an object property type. As an example and not by way of limitation, a book object 300 may include an "Author" object property 310, and the "Author" object property may specify the property name 320 (e.g., "Author") and type of property value 330 (e.g., string or array). In particular embodiments, an object property 310 may include a type that is a reference to another object. As an example and not by way of limitation, a book object 300 may include an "Author" object property 310, and the "Author" object property 310 may include a reference to a different object, which may be an "Author" object. Although this disclosure describes and illustrates particular object properties 310 and object property types associated with particular property specifications, this disclosure contemplates any suitable object properties 310 and object property types associated with any suitable property specifications.

In particular embodiments, object 300 may be associated with an object specification, where an object specification may refer to a format, ordering, or content of a particular type of object 300. As an example and not by way of limitation, a book object specification may include a list of particular properties 310 (e.g., ISBN, title, author, image, description, number of pages) that are included in a book object 300. In particular embodiments, a particular object specification may include property specifications for the properties 310 that are part of a particular object 300. Although this disclosure describes and illustrates particular objects 300 associated with particular object specifications, this disclosure contemplates any suitable objects 300 associated with any suitable object specifications.

Figure 4:
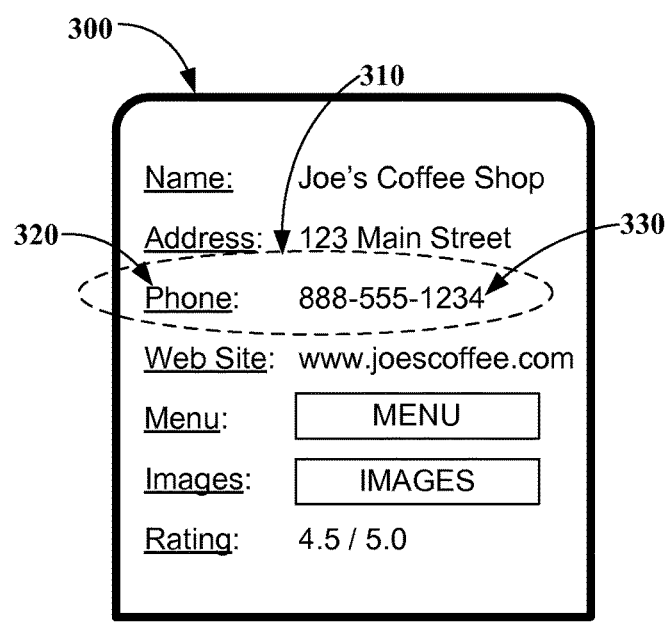
FIG. 4 illustrates another example object with example properties.

FIG. 4 illustrates another example object 300 with example properties 310. In the example of FIG. 4, object 300 may correspond to a restaurant named "Joe's Coffee Shop," and properties 310 may include the restaurant's name, address, phone number, web site, menu, images, or rating. In FIG. 4, property 310 may include property name 320 "Phone" and property value 330, which includes a phone number for "Joe's Coffee Shop." Similarly, in FIG. 4, property name 320 "Menu" may be associated with a property 310 that includes property value 330 with a sample menu or a hyperlink to a menu. In FIG. 4, a property 310 may include property name 320 "Images" and property value 330 with one or more pictures of "Joe's Coffee Shop." In FIG. 4, object 300 may be referred to as restaurant object 300, and a restaurant object specification may include a list of properties 310 (e.g., Name, Address, Phone, Web Site, Menu, Images, or Rating) that are included in restaurant object 300.

Figure 5:
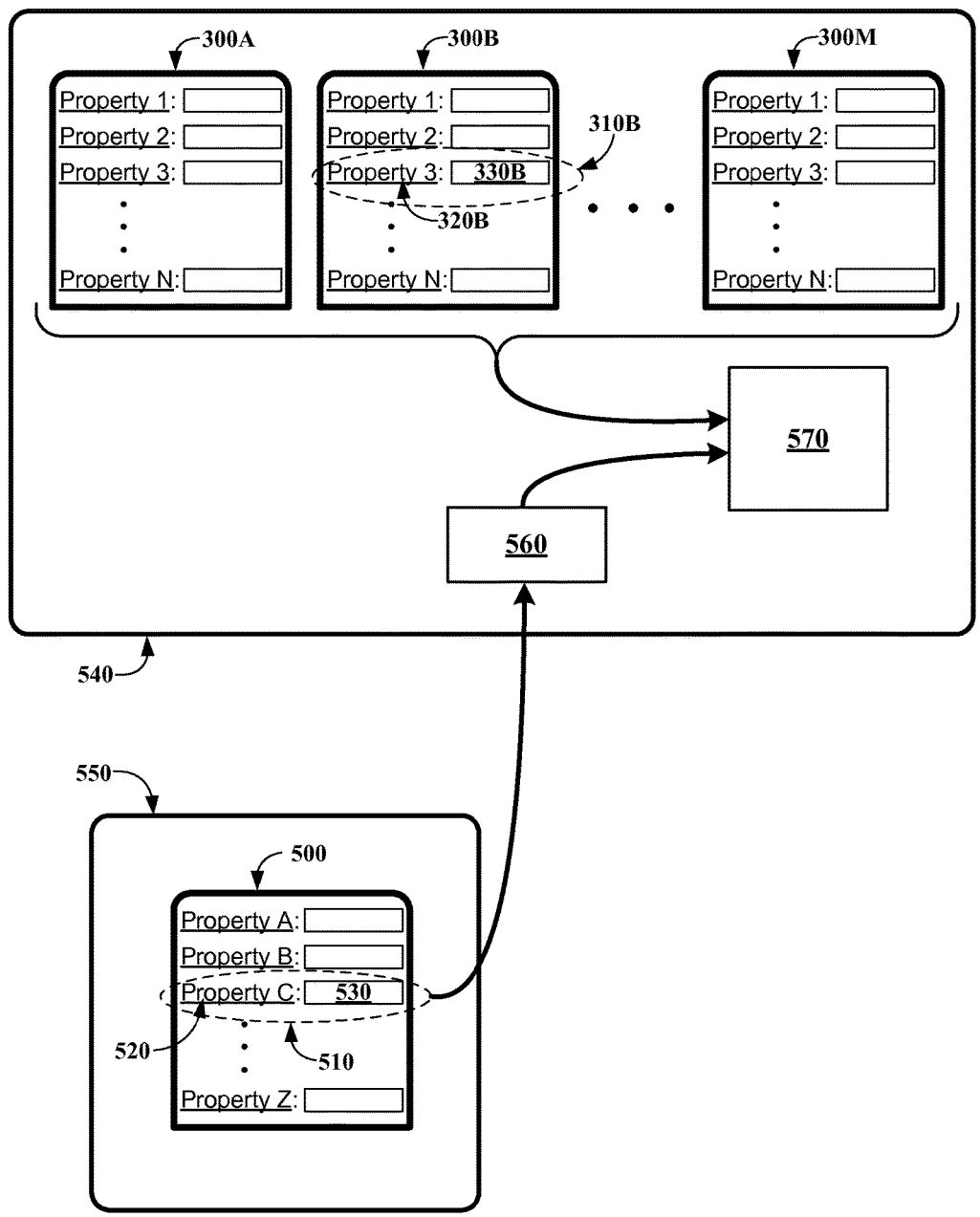
FIG. 5 illustrates two example systems with example objects and example properties.

FIG. 5 illustrates two example systems 540 and 550 with example objects 300 and 500, respectively, and example properties 310 and 510, respectively. In particular embodiments, system 540 may be referred to as a first-party system 540. In particular embodiments, system 540 may be a computer system 100, a network 110, a social-networking system 160, or part of a computer system 100, network 110, or social-networking system 160. In particular embodiments, system 540 may include one or more objects 300, and each object 300 may include one or more object properties 310. In particular embodiments, objects 300 and object properties 310 of system 540 may be referred to as first-party objects 300 and first-party object properties 310, respectively. In particular embodiments, system 550 may be a computer system 100, a network 110, or a social-networking system 160 of a third-party and may be referred to as a third-party system 550. In particular embodiments, third-party system 550 may include one or more objects 500, and each object 500 may include one or more object properties 510. In particular embodiments, objects 500 and object properties 510 of system 550 may be referred to as third-party objects 500 and third-party object properties 510, respectively.

In particular embodiments, an object 300 of system 540 may have one or more unspecified or missing properties 310 or unspecified or missing portions of properties 310. In particular embodiments, an unspecified or missing property 310 may refer to a property 310 that has one or more missing elements or portions, such as for example a missing property value 330 or a missing portion of property value 330. In particular embodiments, if an object 300 of system 540 has one or more unspecified or missing properties 310, values for missing properties 310 may be obtained from other objects, such as for example from objects 500 of a third-party system 550.

In particular embodiments, system 540 may not include a particular object 300. In particular embodiments, if a particular object 300 is missing from system 540, the missing information for a particular object 300 may be obtained from one or more objects 500 of one or more third-party systems 550. In particular embodiments, if a particular object 300 is missing from system 540, one or more properties 310 for missing object 300 may be obtained from one or more properties 510 of one or more third-party systems 550.

In particular embodiments, a property 310 obtained by system 540 may be said to be field-mapped when all or part of its property 310 or value 330 is obtained from another source, such as for example from a third-party system 550. Similarly, in particular embodiments, a third-party object 500 is said to inherit from a first-party object 300 when all or part of the associated properties 310 of object 300 are obtained from third-party object 500. In particular embodiments, a field mapping 560 may include a routine of a first-party system 540 that provides, or field maps, an object 500 or property 510 from a third-party system 550 to a first-party system 540. As an example and not by way of limitation, a book object 300 of a first-party system 540 may have an ISBN property 310 and may be missing a book-title property 310. In particular embodiments, a field mapping 560 may provide a specified book-title property 510 of a third-party object 500 to an unspecified first-party book-title property 310, and book-title property 310 is then said to be field-mapped from third-party object 500 or property 510.

In particular embodiments, a first-party property 310 may be field-mapped from a third-party property 510 even though properties 310 and 510 may contain incompatible information, may have incompatible property specifications, or may have property specifications that do not conform to one another. In particular embodiments, a third-party object 500 may inherit from a first-party object 300 even though the objects may have object specifications or may include properties with property specifications that do not conform to one another. A field mapping may allow a third-party object to inherit from a first-party object when they otherwise would not be able to due to property or object specification incompatibilities. In particular embodiments, properties 310 and 510 having incompatible information may refer to information, fields, elements, or data of properties 310 and 510 that may not conform to a predefined property specification or format or that may include information of different data types. As an example and not by way of limitation, property 310B of object 300B may include value 330B in an array format, which may be incompatible with property 510 of object 500 that may include value 530 in a string format.

In particular embodiments, a field mapping 560 may be applied to a property 510 of a third-party system. A field mapping 560 may include one or more routines to resolve an incompatibility between property 510 of third-party system 550 and property 310 of first-party system 540. In particular embodiments, a field mapping 560 may include applying a routine to transform or modify property 510 of third-party system 550 into information with a format or data type compatible with property 310. In particular embodiments, a property of an object as modified according to a field mapping 560 may be provided as a response to a request. In particular embodiments, in response to a request for a property of an object, a field mapping 560 may provide a response that includes a transformed or modified property 510 of a third-party system. In particular embodiments, a request may be associated with a search query for objects 300, properties 310, or objects 300 that include a particular property 310. In particular embodiments, a request may be associated with a search query for objects or properties received by a first party from a user. In particular embodiments, in response to a request, a field mapping 560 may provide a response to an object interface 570, where object interface 570 may be an application or routine of system 540 that interfaces with, monitors, coordinates, or manages objects 300 of system 540.

In particular embodiments, a field mapping 560 may include mapping, converting, or transforming incompatible information of a property 510 of a third-party system 550 into information that is compatible with a property 310 of a system 540. In particular embodiments, a third-party object 500 can inherit from a first-party object 300, and inheritance at an object level may be made possible by one or more field mappings 560 at a property level. In particular embodiments, a field mapping 560 may allow the use of third-party objects 500 or properties 510 so that they behave like native objects 300 or properties 310 of a first-party system 540. In particular embodiments, applying a field mapping 560 may include connecting an unspecified or missing property 310 with a specified property 510 along with one or more mapping, conversion, or transform operations to apply to property 510. In particular embodiments, a field mapping 560 applied to information, fields, elements, or data of a property 510 of a third-party system 550 may produce information, fields, elements, or data that is compatible with an associated property 310 of system 540.

In particular embodiments, a field mapping 560 may be determined by first-party system 540. In particular embodiments, a field mapping 560 may be derived from a specification or type of a first-party object 300 or property 310. In particular embodiments, a field mapping 560 may be derived from a specification or type of a first-party object 300 or property 310 and a specification or type of a corresponding third-party object 500 or property 510. In particular embodiments, a specification of a third-party object 500 or property 510 may be different than a specification of a first-party object 300 or property 310. As an example and not by way of limitation, a particular first-party property 310 may have a property specification that calls for a property value 330 with a string data type, and a corresponding third-party property 510 may have a property specification that calls for a property value 530 with a float data type. In particular embodiments, a field mapping 560 may include modifying or converting a property value from one data type to another, such as for example converting a float data type to a string data type.

As illustrated in FIG. 5, one or more outputs of a field mapping 560 may be supplied to an object interface 570 along with one or more native properties 310 or objects 300 of system 540. In particular embodiments, object interface 570 may be associated with a search query for particular objects 300 or particular properties 310. As a result of such a search query, object interface 570 may receive native objects 300 or native properties 310 of system 540 associated with the search query. In particular embodiments, as a result of such a search query, object interface 570 may receive, from field mapping 560, objects 500 or field-mapped properties 510 of third-party system 550, where the third-party objects 500 or properties 510 are modified by field mapping 560 to conform to object 300 or property 310 specifications of system 540. In particular embodiments, object interface 570 may treat third-party objects 500 and field-mapped properties 510 received from field mapping 560 as native objects 300 and native properties 310 of system 540. In particular embodiments, an inheritance relationship may exist between first-party and third-party object types, where a third-party object type may inherit from a first-party object type, and an associated third-party object 500 can act as a native first-party object 300. In the example of FIG. 5, object 500 may be associated with a book object 500 type of third-party system 550, and book object 500 type may inherit from a book object 300 type of first-party system 540 so that book object 500 can act as a first-party book object 300.

Figure 6:
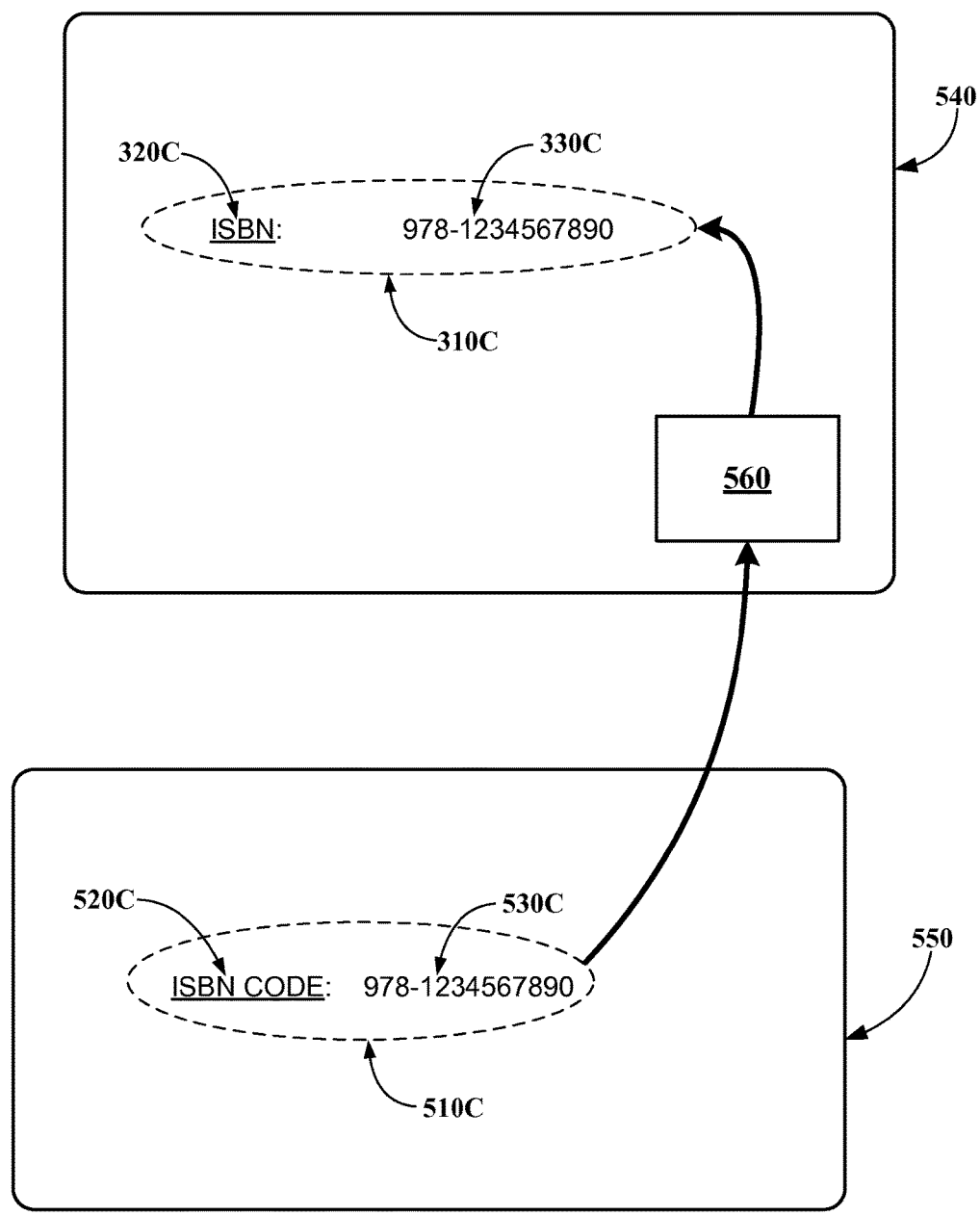
FIGS. 6-8 illustrate example properties field-mapped from example third-party systems.

FIG. 6 illustrates an example property 310C field-mapped from property 510C of third-party system 550. In FIG. 6, property 310C represents an example ISBN property with property name 320C "ISBN," and property 310C may be part of a book object 300. In FIG. 6, a request for an ISBN property 310C may be received by a part of system 540 (e.g., by object interface 570). As a result of the request, property 510C of third-party system 550 may be accessed by a part of system 540, and property 510C of third-party system 550 may be received by field mapping 560. As an example and not by way of limitation, system 540 or system 550 may include a web site, such as FACEBOOK.com, AMAZON.com, BARNESANDNOBLE.com, GOODREADS.com, or a web site of an author or a publisher. In FIG. 6, property value 330C and corresponding property value 530C may have compatible data types or formats, and properties 310C and 510C may have different property names, "ISBN" 320C and "ISBN CODE" 520C, respectively. In FIG. 6, field mapping 560 may resolve the difference or incompatibility in property names 320C and 520C. As illustrated in FIG. 6, after accessing or receiving a copy of third-party property 510C, "ISBN CODE: 978-1234567890," field mapping 560 may return or provide the property value "978-1234567890"

to property 310C, resulting in property 310C "ISBN: 978-1234567890" as a result of the request. In particular embodiments, property 310C is said to be a field-mapped property that is field-mapped from third-party property 510C.

Figure 7:
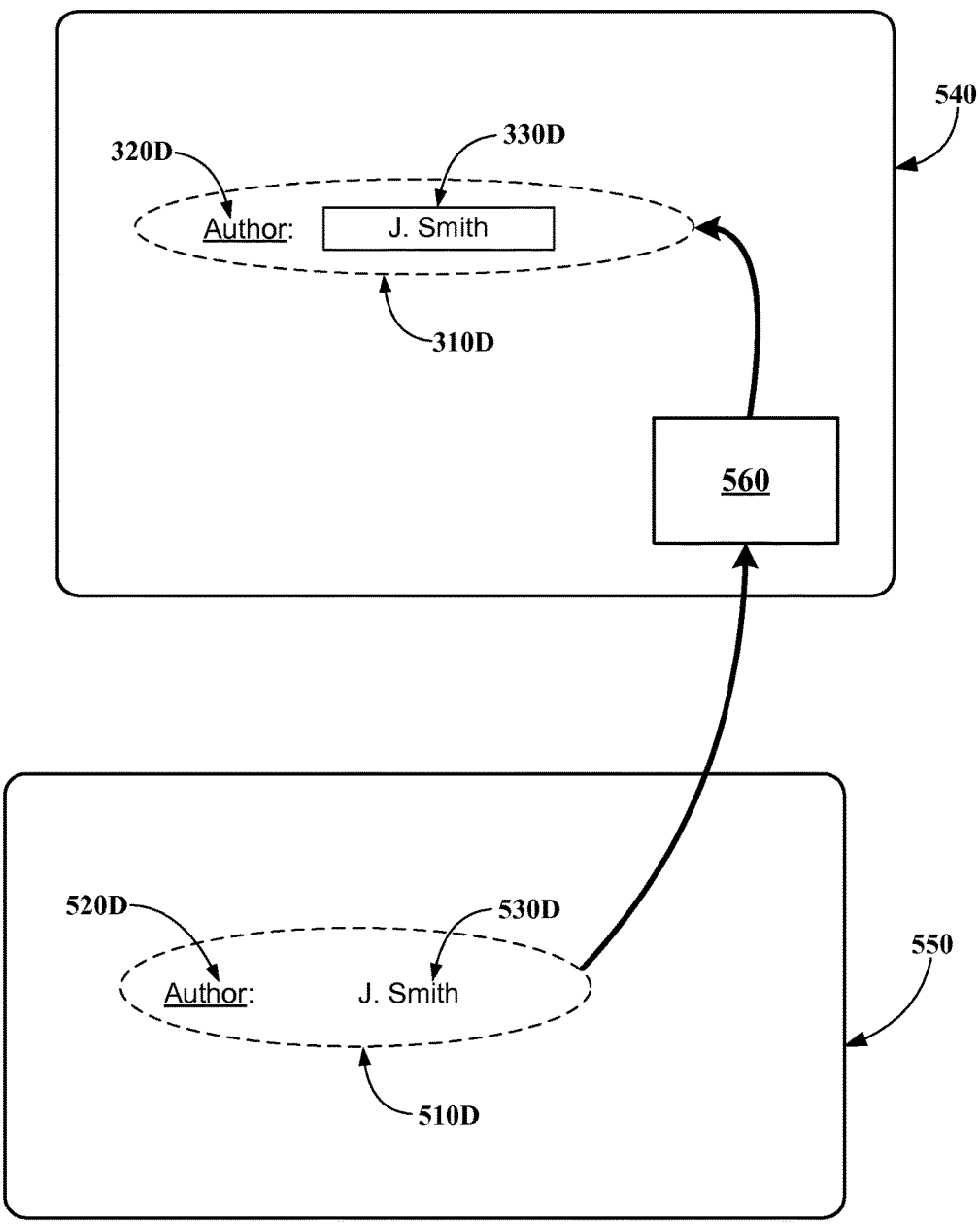

FIG. 7 illustrates an example property 310D field-mapped from property 510D of third-party system 550. In FIG. 7, property 310D represents an example author property of first-party system 540 with property name 320D "Author," and property 310D may be part of a book object 300. In FIG. 7, a request for an author property 310D may be received by a part of system 540. As a result of the request, property 510D of third-party system 550 may be accessed by a part of system 540, and property 510D of third-party system 550 may be received by field mapping 560. In particular embodiments, two properties 310 and 510 associated with field mapping 560 may include information of different data types that are incompatible, and field mapping 560 may coerce or resolve the data-type difference between the two incompatible property types. In the example of FIG. 7, author property 310D may include property value 330D with an array data type, where an array type may allow for books having one or more authors. In FIG. 7, third-party author property 510D may include property value 530D with a string data type containing a single author. In FIG. 7, field mapping 560 may convert or transform string-type property value 530D into an array type, where the array may contain a single value. In FIG. 7, field mapping 560 may return or supply a converted property value 530D to author property 310D in an array type format that is compatible with property value 330D. In particular embodiments, field mapping 560 is said to embody an field mapping relationship between property 310D of first party 540 and property 530D of third party 550. In particular embodiments, field mapping 560 may transform a third-party property value from one data type (e.g., string data type) to another data type (e.g., array data type).

Figure 8:
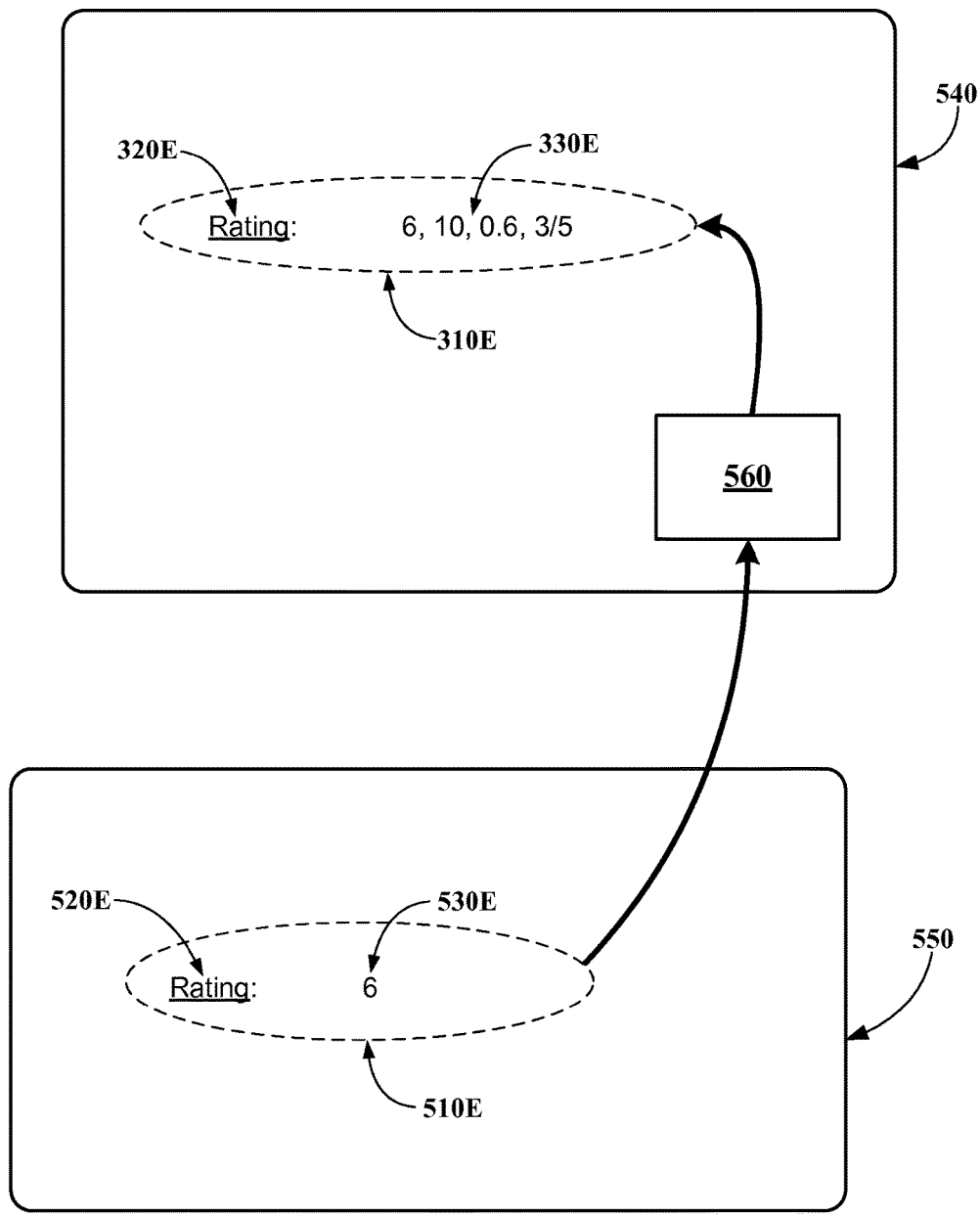

FIG. 8 illustrates an example property 310E field-mapped from property 510E of third-party system 550. In FIG. 8, example third-party system 550 may include a book-rating property 510E that includes a string "6," where the string "6" may represent a rating of 6 out of 10. In FIG. 8, system 540 may include a book-rating property 310E with a data structure that includes a rating value, what the rating is out of, a normalized rating value, and a rating on a scale of zero to five stars. As illustrated in FIG. 8, field mapping 560 may receive book-rating property 510E of "6" and transform it into a data structure that includes "6" (a rating value), "10" (what the rating is out of), "0.6" (=6/10, a normalized rating value), and "3/5" (indicating three stars out of five). In the example of FIG. 8, field mapping 560 may receive third-party book-rating property 510E and may provide a response corresponding to a native book-rating property 310E that includes the following: "6, 10, 0.6, 3/5".

Figure 9:
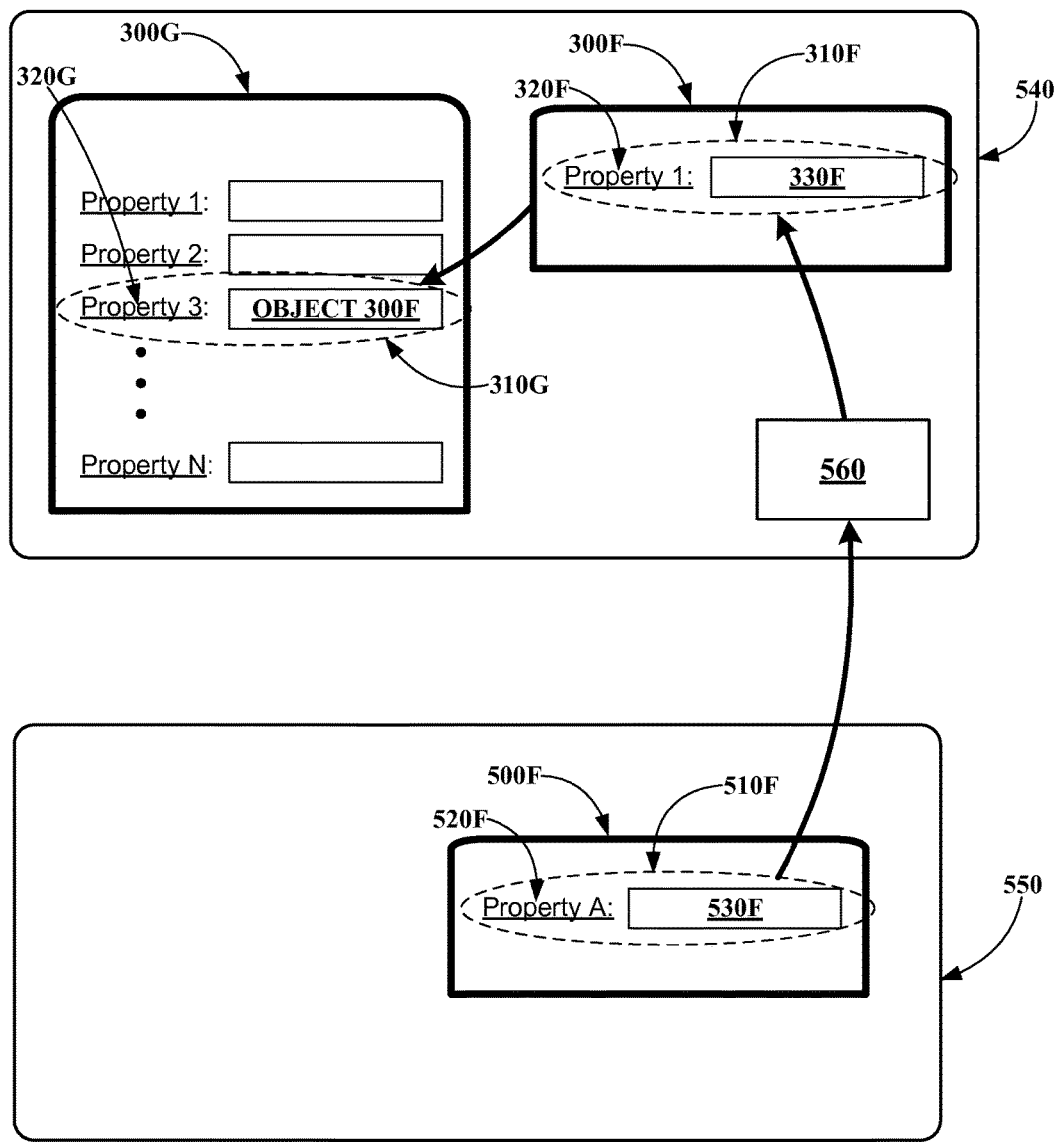
FIG. 9 illustrates an example third-party object that inherits from an example first-party object.

FIG. 9 illustrates an example third-party object 500F of third-party system 550 that inherits from an example first-party object 300F of first-party system 540. In the example of FIG. 9, inheritance of object 300F is made possible by field mapping 560 applied to property 510F and property 310F. In particular embodiments, a third-party object 500 can inherit from a first-party object 300, and inheritance at an object level may be made possible by one or more field mappings 560 at a property level. In FIG. 9, field mapping 560 may allow the use of third-party object 500F so that it behaves like a native first-party object 300F. As illustrated in FIG. 9, object property 310G includes a value that is a reference to object 300F. In particular embodiments, an object property 310G of an object 300G may include a reference to another object 300F. In the example of FIG. 9, object 500F may be an author object 500F of third-party system 550, and object 300F may be an author object 300F of first-party system 540. In FIG. 9, object 300G may be a book object 300G and may include an author property 310G. In FIG. 9, author property 310G may include a value with a reference to author object 300F, and in turn, object 500F may inherit from object 300F.

In particular embodiments, a system 540 may include one or more field mappings 560. In particular embodiments, a system 540 may include multiple field mappings 560, and each field mapping 560 may be used to handle missing information for a particular data type, object 300, or property 310. In particular embodiments, a system 540 may include a single field mapping to handle substantially all instances of missing or unspecified properties 310. In particular embodiments, one or more field mappings 560 may receive one or more missing properties 510 from one or more third-party systems 550. Although this disclosure describes and illustrates particular field mappings 560 applied to particular properties 310 and 510 having particular data types, this disclosure contemplates any suitable field mappings 560 applied to any suitable properties 310 and 510 having any suitable data types.

Figure 10:
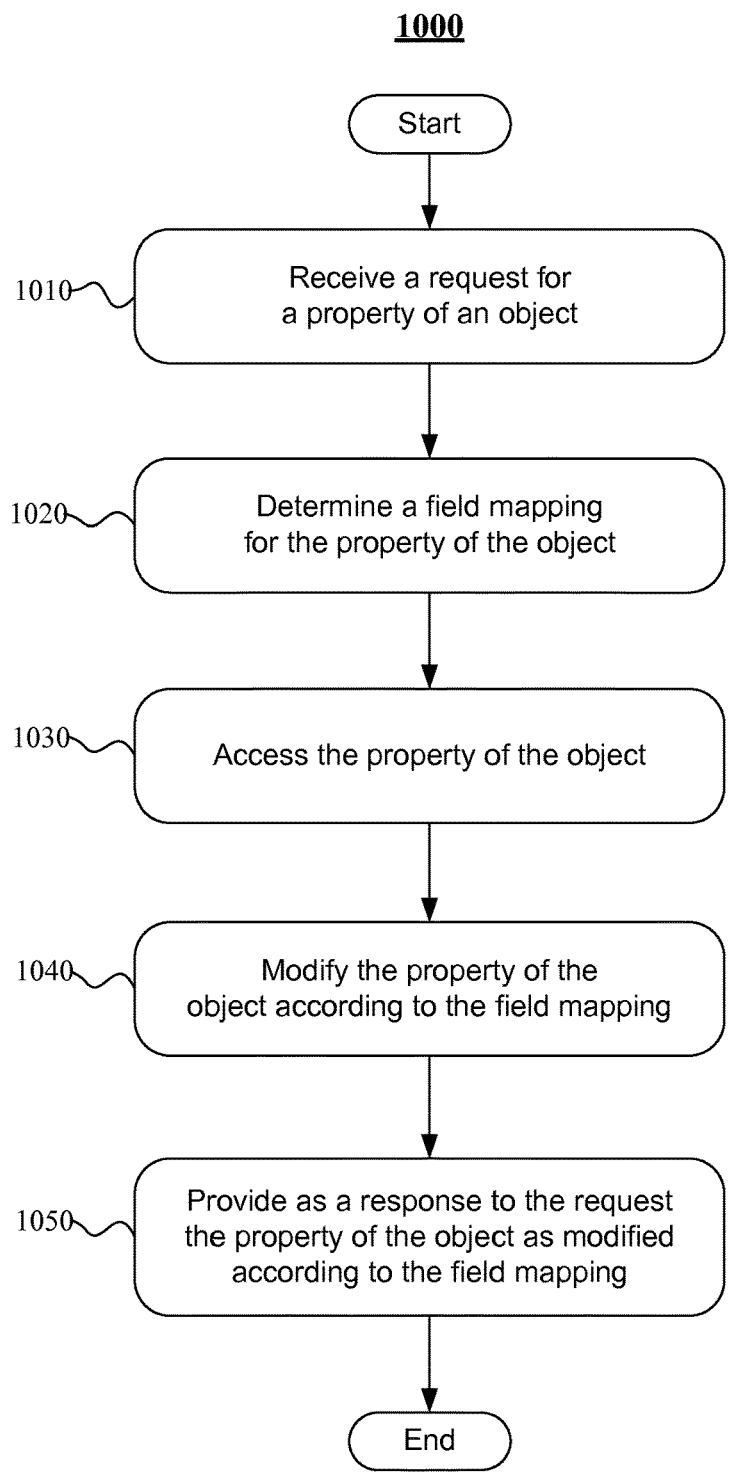
FIG. 10 illustrates an example method for applying a field mapping to a property of an object.

FIG. 10 illustrates an example method for applying a field mapping to a property of an object. The method may begin at step 1010, where a request for a property of an object is received. In particular embodiments, the property may have a property type, and the property may include a property value and a property name. In particular embodiments, the property may not conform to a property specification for the property type. In particular embodiments, the property specification may be associated with a first party, and the property and the object may be associated with a third party. At step 1020, a field mapping for the property of the object may be determined, where the field mapping may be derived from the property specification. At step 1030, the property of the object may be accessed. At step 1040, the property of the object may be modified according to the field mapping. In particular embodiments, the field-mapped property may conform to the property specification for the property type. At step 1050, a response to the request may be provided, where the response may include the property of the object as modified according to the field mapping, at which point the method may end.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for applying a field mapping to a property of an object including the particular steps of the method of FIG. 10, this disclosure contemplates any suitable method for applying a field mapping to a property of an object including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
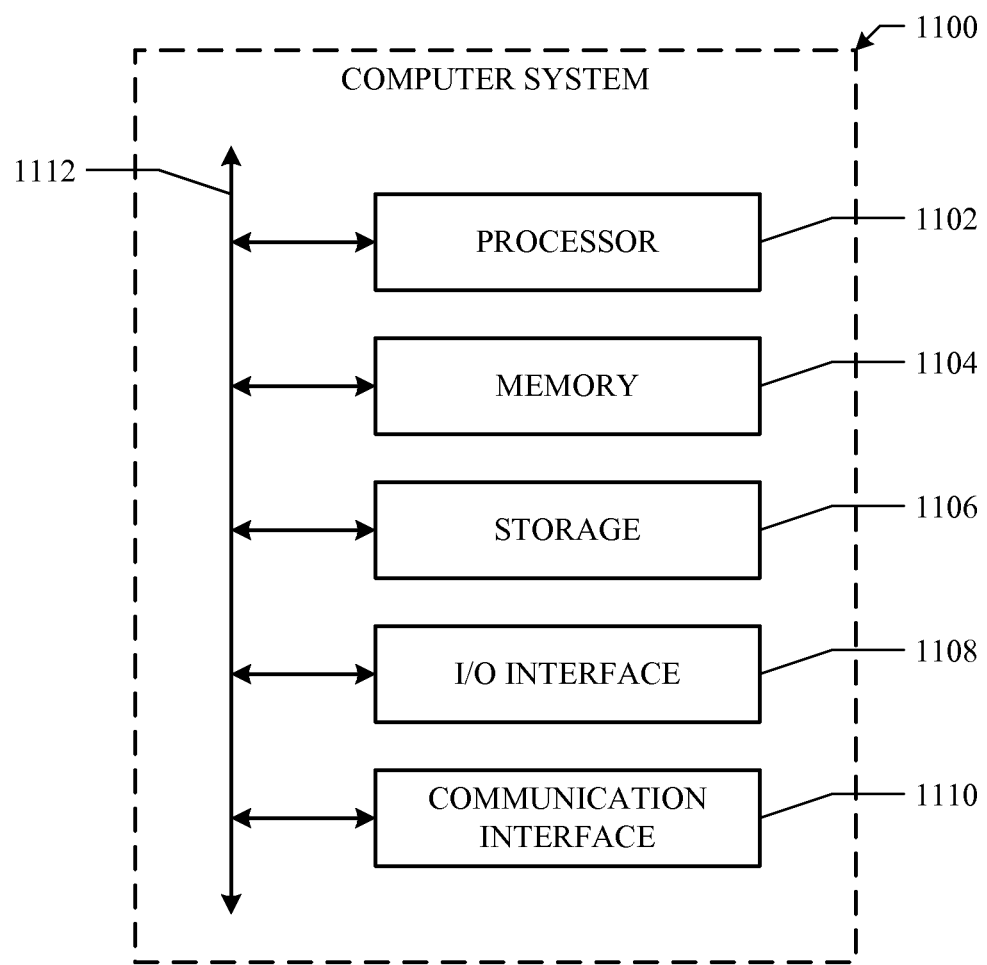
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, receiving a request for an object from a native system that is missing a value for a property;
by one or more computing devices, determining a field mapping for the property for the object comprising:
determining a third party object, from a third party system, that matches the object from the native system based on one or more similar other properties;
determining that the third party object has a third party value for a third party property that corresponds to the property;
determining an incompatibility between a data type of the third party property and the property based on a property specification associated with the property and a property specification associated with the third party; and
determining one or more routines to resolve the incompatibility, wherein at least one of the routines transforms the third party value into a normalized value that conforms to the property specification for the property;
by one or more computing devices, determining a query for (1) accessing the third party object having the third party property and (2) accessing properties of the object from the native system;
by one or more computing devices, in response to receiving the request for the property:
executing the query to retrieve the third party value of the third party property from a third party system; and
modifying the retrieved third party value of the third party property of the third party object according to the field mapping; and
by one or more computing devices, providing, as a response to the request, the object with the value for the property as modified according to the field mapping to provide access to the normalized value from the third party property in the native system through a native call to the property on the object.

2. The method of claim 1, wherein the object is a web page.

3. The method of claim 1, wherein:
the computing devices are associated with a first party;
the property specification and the field mapping are associated with the first party;
the object is associated with a third party that is independent of the first party; and
the third party uses a different property specification for the property of the object.

4. The method of claim 3, wherein the first party provides a social-networking system.

5. The method of claim 4, wherein:
the request is associated with a search query for objects comprising the property received by the first party from a user; and
the search query encompasses objects of the first party within the social-networking system and objects of the third party outside the social-networking system.

6. The method of claim 3, wherein the field mapping is associated with an inheritance relationship between objects of the first party and objects of the third party.

7. The method of claim 1, wherein modifying the property of the object according to the field mapping comprises transforming the property value from one data type to another data type.

8. One or more computer-readable non-transitory storage media embodying software that is operable when executed to:
receive a request for an object from a native system that is missing a value for a property;
determine a field mapping for the property for the object comprising:
determining a third party object, from a third party system, that matches the object from the native system based on one or more similar other properties;
determining that the third party object has a third party value for a third party property that corresponds to the property;
determining an incompatibility between a data type of the third party property and the property based on a property specification associated with the property and a property specification associated with the third party;
determining one or more routines to resolve the incompatibility, wherein at least one of the routines transforms the third party value into a normalized value that conforms to the property specification for the property; and
by one or more computing devices, determining a query for (1) accessing the third party object having the third party property and (2) accessing properties of the object from the native system;
in response to receiving the request for the property:
executing the query to retrieve the third party value of the third party property from a third party system; and
modify the retrieved third party value of the third party property of the third party object according to the field mapping; and
provide, as a response to the request, the object with the property as modified according to the field mapping to provide access to the normalized value from the third party property in the native system through a native call to the property on the object.

9. The media of claim 8, wherein the object is a web page.

10. The media of claim 8, wherein:
the property specification and the field mapping are associated with a first party;
the object is associated with a third party that is independent of the first party; and
the third party uses a different property specification for the property of the object.

11. The media of claim 10, wherein the first party provides a social-networking system.

12. The media of claim 11, wherein:
the request is associated with a search query for objects comprising the property received by the first party from a user; and
the search query encompasses objects of the first party within the social-networking system and objects of the third party outside the social-networking system.

13. The media of claim 10, wherein the field mapping is associated with an inheritance relationship between objects of the first party and objects of the third party.

14. The media of claim 8, wherein modifying the property of the object according to the field mapping comprises transforming the property value from one data type to another data type.

15. A system comprising:
one or more processors; and
a memory coupled to the processors comprising instructions executable by the processors, the processors being operable when executing the instructions to:
receive a request for an object from a native system that is missing a value for a property;
determine a field mapping for the property for the object comprising:
determining a third party object, from a third party system, that matches the object from the native system based on one or more similar other properties;
determining that the third party object has a third party value for a third party property that corresponds to the property;
determining an incompatibility between a data type of the third party property and the property based on a property specification associated with the property and a property specification associated with the third party;
determining one or more routines to resolve the incompatibility, wherein at least one of the routines transforms the third party value into a normalized value that conforms to the property specification for the property; and
by one or more computing devices, determining a query for (1) accessing the third party object having the third party property and (2) accessing properties of the object form the native system;
in response to receiving the request for the property:
execute the query to retrieve the third party value of the third party property from a third party system; and
modify the retrieved third party value of the third party property of the third party object according to the field mapping; and
provide, as a response to the request, the object with the property as modified according to the field mapping to provide access to the normalized value from the third party property in the native system through a native call to the property on the object.

16. The system of claim 15, wherein the object is a web page.

17. The system of claim 15, wherein:
the property specification and the field mapping are associated with a first party;
the object is associated with a third party that is independent of the first party; and
the third party uses a different property specification for the property of the object.

* * * * *